United States Patent
Yang et al.

(10) Patent No.: US 12,082,108 B2
(45) Date of Patent: Sep. 3, 2024

(54) POWER-SAVING STATE SWITCHING METHOD, TERMINAL AND BASE STATION

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 156 days.

(21) Appl. No.: 17/058,582

(22) PCT Filed: Jun. 3, 2019

(86) PCT No.: PCT/CN2019/089793
§ 371 (c)(1),
(2) Date: Nov. 24, 2020

(87) PCT Pub. No.: WO2019/233369
PCT Pub. Date: Dec. 12, 2019

(65) Prior Publication Data
US 2021/0195517 A1    Jun. 24, 2021

(30) Foreign Application Priority Data
Jun. 4, 2018  (CN) .......................... 201810565820.3

(51) Int. Cl.
*H04W 52/02*    (2009.01)

(52) U.S. Cl.
CPC .................. *H04W 52/0212* (2013.01)

(58) Field of Classification Search
CPC ......... H04W 52/0212; H04W 52/0216; H04W 52/0245; H04W 52/0258; H04W 52/0229; H04W 52/0235; Y02D 30/70
(Continued)

(56) References Cited

U.S. PATENT DOCUMENTS

2007/0072578 A1* 3/2007 Lee .................. H04W 52/0216
                                                        455/343.1
2011/0019602 A1   1/2011 Park et al.
(Continued)

FOREIGN PATENT DOCUMENTS

CN    102804640 A    11/2012
CN    103677214 A    3/2014
(Continued)

OTHER PUBLICATIONS

Extended European Search Report from EP app. no. 19815983.2, dated Jun. 17, 2021.
(Continued)

*Primary Examiner* — Nizam U Ahmed
(74) *Attorney, Agent, or Firm* — Ladas & Parry, LLP

(57) ABSTRACT

A power-saving state switching method, a terminal and a base station are provided. The power-saving state switching method includes configuring, by the base station, a first power consumption mode of the terminal at a first time point, and transmitting configuration information of the first power consumption mode to the terminal. Two or more power consumption modes are supported by the terminal.

19 Claims, 3 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 2013/0005264 | A1* | 1/2013 | Sakata | H04W 52/0229 |
| | | | | 455/41.2 |
| 2015/0092893 | A1* | 4/2015 | Tabet | H04W 52/0209 |
| | | | | 375/340 |
| 2015/0189594 | A1 | 7/2015 | Liang et al. | |
| 2016/0127997 | A1 | 5/2016 | Ang et al. | |
| 2016/0302153 | A1 | 10/2016 | Martin et al. | |
| 2017/0094599 | A1 | 3/2017 | Eskelinen | |
| 2018/0049126 | A1 | 2/2018 | Cheng | |
| 2018/0196972 | A1* | 7/2018 | Lu | H04W 52/0274 |

FOREIGN PATENT DOCUMENTS

| | | |
|---|---|---|
| CN | 105580488 A | 5/2016 |
| CN | 105657794 A | 6/2016 |
| CN | 105704791 A | 6/2016 |
| CN | 106879007 A | 6/2017 |
| CN | 106879051 A | 6/2017 |
| EP | 1453333 A1 | 9/2004 |
| EP | 2869643 A1 | 10/2013 |
| EP | 3076719 A1 | 10/2014 |
| WO | 2018031327 A1 | 2/2018 |

OTHER PUBLICATIONS

"Control Information for UE Power Saving", R1-1716553, 3GPP TSG-RAN WG1 Meeting NR#3, Nagoya, Japan, Sep. 18-21, 2017.
First Office Action and search report from CN app. no. 201810565820.3, dated Apr. 20, 2020 with English translation from Global Dossier.
First Office Action and search report from TW app. no. 108119306, dated Mar. 26, 2021, with machine English translation.
International Search Report from PCT/CN2019/089793, dated Sep. 2, 2019, with English translation from WIPO.
Written Opinion of the International Searching Authority from PCT/CN2019/089793, dated Sep. 2, 2019, with English translation from WIPO.
International Preliminary Report on Patentability from PCT/CN2019/089793, dated Dec. 8, 2020, with English translation from WIPO.
Office action from the corresponding European Patent Application No. 19815983.2 dated Jul. 10, 2023.
Intel Corporation, "On MIMO layer adaptation," R1-1700340, 3GPP TSG RAN WGI NR Ad-Hoc meeting, Spokane, USA, Jan. 16-20, 2017, Agenda item: 5.1 .2.1, Document for: Discussion and Decision, all pages.

* cited by examiner configuring, by a base station, a first power consumption mode of a terminal at a first time point, and transmitting, by a base station, configuration information of the first power consumption mode to the terminal ⸺ 41
Fig.4
configuring, by a terminal, a power consumption mode of the terminal as a first power consumption mode at a first time point ⸺ 51
Fig.5
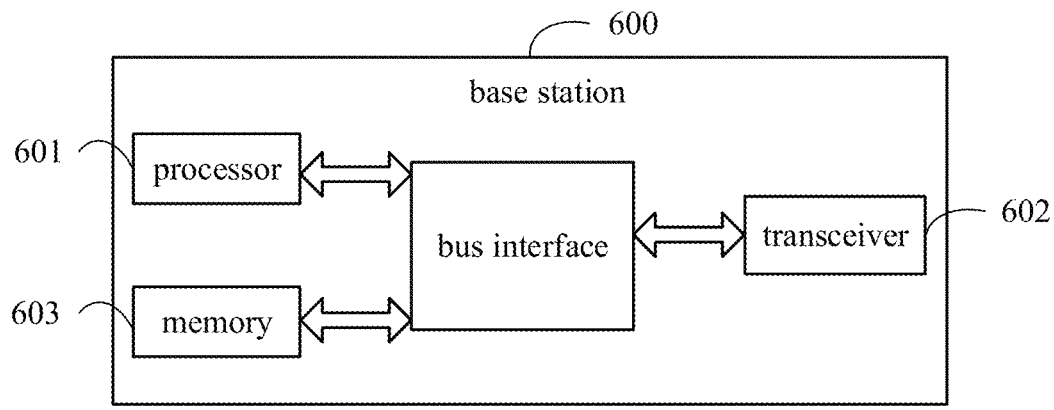
Fig.6
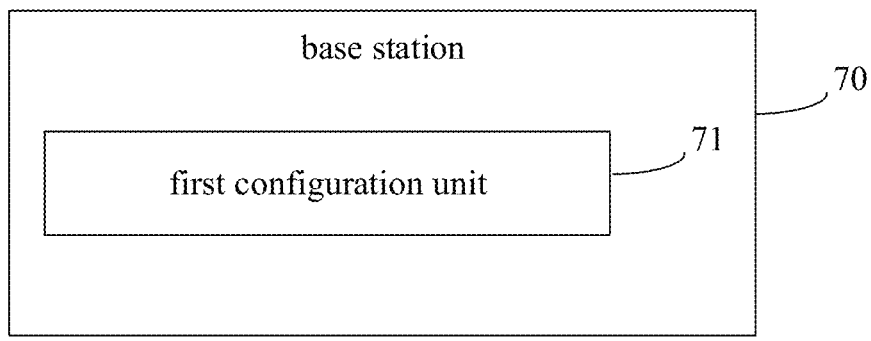
Fig.7

POWER-SAVING STATE SWITCHING
METHOD, TERMINAL AND BASE STATION

CROSS-REFERENCE TO RELATED
APPLICATIONS

The present application is the U.S. national phase of PCT Application No. PCT/CN2019/089793 filed on Jun. 3, 2019, which claims a priority of to the Chinese patent application No. 201810565820.3 filed in China on Jun. 4, 2018, the disclosures of which are incorporated herein by reference in their entireties.

TECHNICAL FIELD

The present disclosure relates to the field of mobile communication technology, in particular to a power-saving switching method, a terminal and a base station.

BACKGROUND

Along with the development of the wireless communication system, there are various terminal types and service types, and such requirements on a terminal as power-saving, network resource-saving and the satisfaction on various service types coexist. In order to reduce the power consumption of the terminal and ensure the service accessibility at the same time, a Wakeup Signal (WUS) has been introduced, and electricity consumption of the terminal is relatively low when the terminal monitors the WUS. Upon the receipt of a WUS from the terminal itself, the terminal is woken up by the WUS, and then a communication module (whose electricity consumption is relatively high) is enabled to receive a paging message, or receive a Physical Downlink Control Channel (PDCCH), or perform Radio Resource Management (RRM) measurement, or receive a synchronization message, thereby to reduce the power consumption of the terminal.

FIGS. 1 and 2 show the transmission of the WUS in a Radio Resource Control (RRC) idle state and an RRC connected state. When a User Equipment (UE) is in the idle state, it may enter a sleep state with extremely low electricity consumption. When downlink data is to be transmitted by a network side device to the UE, the WUS is transmitted to the UE. Upon the receipt of the WUS, the UE is woken up, and transmit data to, or receive data from, the network side device. After the transmission or reception of the data has been completed, the UE may enter the sleep state with extremely low electricity consumption again. Similarly, when the UE is in the RRC connected state and enters an inactive state, it may enter the sleep state with extremely low electricity consumption. When the UE needs to receive the downlink data, the network side device may transmit the WUS to the UE. Upon the receipt of the WUS, the UE is waked up and starts to transmit data to, or receive data from, the network side device. Through the above, it is able to reduce the power consumption of the UE.

Currently, the WUS is adopted in a Long Term Evolution (LTE) system-based Machine Type Communication (MTC) or Narrow Band Internet of Thing (NB-IOT) to further reduce the power consumption. However, in the current MTC or NB-IOT, in terms of power-saving configurations of the terminal, there are merely a power-saving configuration and a non-power-saving configuration, and the switching of power-saving modes in different power-saving configurations has not been involved yet.

SUMMARY

An object of the present disclosure is to provide a power-saving state switching method, a terminal and a base station, so as to configure different power consumption modes for the terminal, thereby to achieve the switching among different power-saving states.

In order to solve the above technical problem, the present disclosure provides in some embodiments a power-saving state switching method, including configuring, by a base station, a first power consumption mode of a terminal at a first time point, and transmitting configuration information of the first power consumption mode to the terminal. Two or more power consumption modes are supported by the terminal.

In addition, the present disclosure provides in some embodiments a power-saving state switching method, including configuring, by a terminal, a power consumption mode of the terminal as a first power consumption mode at a first time point. Two or more power consumption modes are supported by the terminal.

In addition, the present disclosure provides in some embodiments a base station, including a transceiver, a memory, a processor, and a computer program stored in the memory and capable of being executed by the processor. The processor is used to read the computer program stored in the memory so as to configure a first power consumption mode of a terminal at a first time point, two or more power consumption modes are supported by the terminal, and the transceiver is used to transmit configuration information of the first power consumption mode to the terminal.

In addition, the present disclosure provides in some embodiments a base station, including a first configuration unit used to configure a first power consumption mode of a terminal at a first time point, and transmit configuration information of the first power consumption mode to the terminal. Two or more power consumption modes are supported by the terminal.

In addition, the present disclosure provides in some embodiments a terminal, including a transceiver, a memory, a processor, and a computer program stored in the memory and capable of being executed by the processor. The processor is used to read the computer program stored in the memory so as to configure a power consumption mode of the terminal as a first power consumption mode at a first time point. Two or more power consumption modes are supported by the terminal.

In addition, the present disclosure provides in some embodiments a terminal, including a first configuration module used to configure a power consumption mode of the terminal as a first power consumption mode at a first time point. Two or more power consumption modes are supported by the terminal.

In addition, the present disclosure provides in some embodiments a computer-readable storage medium storing therein instructions. The instructions are executed by a computer, so as to implement the above-mentioned power-saving state switching method.

According to the power-saving state switching method, the terminal and the base station in the embodiments of the present disclosure, as compared with the related art, it is able to configure different power consumption modes for the terminal, thereby to achieve the switching among different power-saving states.

BRIEF DESCRIPTION OF THE DRAWINGS

In order to illustrate the technical solutions of the present disclosure in a clearer manner, the drawings desired for the embodiments of the present disclosure will be described hereinafter briefly. Obviously, the following drawings merely relate to some embodiments of the present disclosure, and based on these drawings, a person skilled in the art may obtain the other drawings without any creative effort.

FIG. 4 is a flow chart of a power-saving state switching method according to an embodiment of the present disclosure;

FIG. 5 is a flow chart of another power-saving state switching method according to an embodiment of the present disclosure;

FIG. 6 is a schematic view showing a base station according to an embodiment of the present disclosure;

FIG. 7 is another schematic view showing the base station according to an embodiment of the present disclosure;

DETAILED DESCRIPTION

Figure 1:
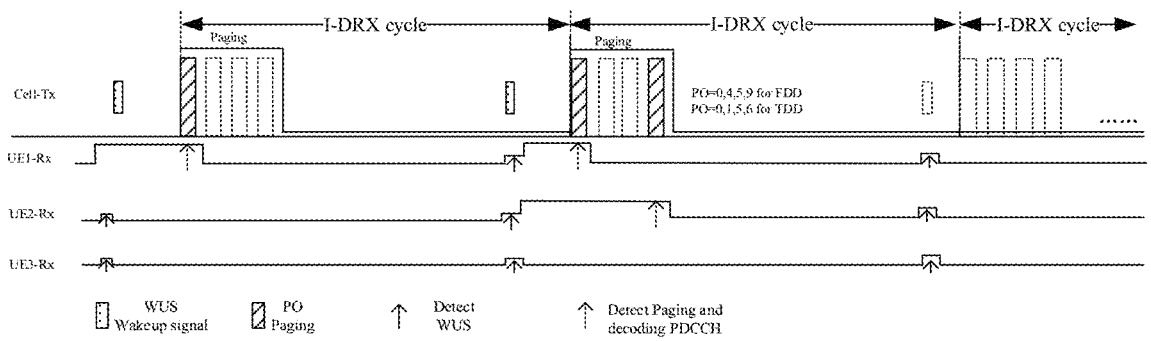
FIG. 1 is a schematic view showing a scenario where a WUS is transmitted.
Figure 2:
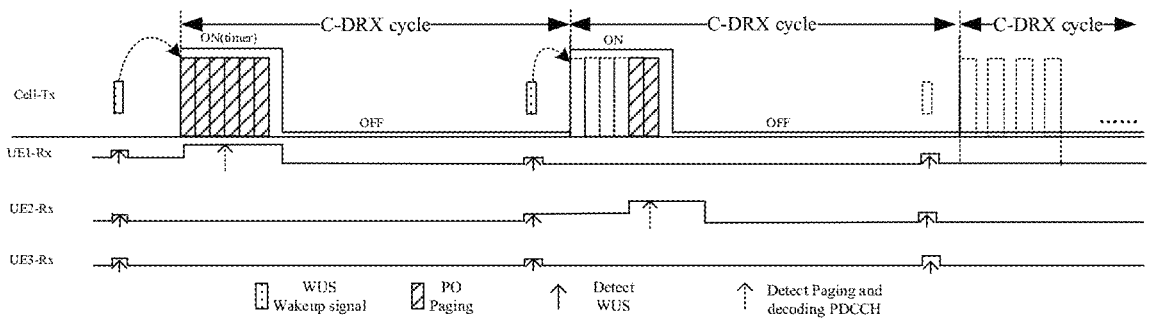
FIG. 2 is another schematic view showing the scenario where the WUS is transmitted.

Hereinafter, exemplary embodiments of the present disclosure will be described in more detail with reference to the drawings. Although exemplary embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure and to fully convey the scope of the present disclosure to a person skilled in the art Such terms as "first" and "second" involved in the specification and the claims are used to distinguish similar objects, and are not necessarily used to describe a specific sequence or sequence. It should be understood that the data used in this way can be interchanged under appropriate circumstances, so that the embodiments of the present application described herein can be implemented in a sequence other than those illustrated or described herein, for example. In addition, the terms "including" and "having" and any variations of them are intended to cover non-exclusive inclusions. For example, a process, method, system, product, or device that includes a series of steps or units is not necessarily limited to the clearly listed steps or units, these steps or units may include other steps or units that are not clearly listed or are inherent to these processes, methods, products, or device. In the description and claims, "and/or" means at least one of the related objects.

The technology described in the context shall not be limited to a Long Term Evolution (LTE)/LTE-Advanced (LTE-A) system, and it may also be applied to various wireless communication systems, e.g., Code Division Multiple Access (CDMA), Time Division Multiple Access (TDMA), Frequency Division Multiple Access (FDMA), Orthogonal Frequency Division Multiple Access (PFDMA), Single-Carrier Frequency-Division Multiple Access (SC-FDMA), or any other system. The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The Orthogonal Frequency Division Multiple Access (OFDMA) system may be used to implement such radio technologies as Ultra Mobile Broadband (UMB), Evolved-UTRA (E-UTRA), Institute of Electrical and Electronics Engineers (IEEE) 802.11 (Wireless Fidelity (Wi-Fi)), IEEE 802.16 (WiMAX), IEEE 802.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-Generation Partnership Project (3GPP). The CDMA2000 and UMB have been described in literatures from the $3^{rd}$-Generation Partnership Project 2 (3GPP2). The technology described in the context may be applied to the above-mentioned systems and radio technologies, or applied to the other systems and radio technologies. However, a New Radio (NR) system has been described illustratively hereinafter, and terms for the NR system have been used in most of the description, although these technologies may also be applied to the systems other than the NR system.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, the described method may be performed in an order different from that described in the context, and some steps may be added, omitted or combined. In addition, the features described with reference to some examples may be combined in the other examples.

For ease of understanding, Table 1 shows some abbreviations that may occur in the specification.

TABLE 1

| Abbreviation | Complete spelling in English | Meaning in Chinese |
| --- | --- | --- |
| WUS | Wake up signal | Wake up signal |
| RRC | Radio resource control | Radio resource control |
| RRC_IDLE/ RRC_Inactive | RRC_IDLE/RRC_Inactive | RRC idle state, RRC inactive state |
| WUS Area | Wake up signal area | Wake up signal area |
| WUS Area ID | Wake up signal area ID | Wake up signal area ID |
| RRM | Radio resource management | Radio resource management |
| LTE | Long term evolution | Long term evolution |
| NR | Next radio | Next radio |
| On-demand RS | On-demand reference signal | On-demand reference signal |
| RRM | Radio resource management | Radio resource management |
| PSS | Primary synchronization signal | Primary synchronization signal |
| SSS | Secondary synchronization signal | Secondary synchronization signal |
| CRS | Cell reference signal | Common reference signal |

TABLE 1-continued

| Abbreviation | Complete spelling in English | Meaning in Chinese |
|---|---|---|
| CSI-RS | Channel state information reference signal | Channel state information reference signal |
| SRS | Sounding reference signal | Sounding reference signal |
| TRS | Tracking reference signal | Tracking reference signal |
| SSB | Synchronization signal/PBCH | Synchronization broadcasting signal |
| PDCCH | Physical downlink control channel | Physical downlink control channel |
| DCI | Downlink control indication | Downlink control indication |
| RSRP | Reference signal received power | Reference signal received power |
| RSRQ | Reference signal received quantity | Reference signal received quantity |
| RSSI | Reference signal strength indicator | Reference signal strength indicator |
| paging | paging | paging |

Figure 3:
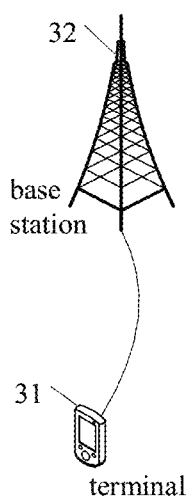
FIG. 3 is a block diagram of an applicable wireless communication system according to an embodiment of the present disclosure.

FIG. 3 is a block diagram of an applicable wireless communication system according to an embodiment of the present disclosure. The wireless communication system includes a terminal 31 and a base station 32. The terminal 31 may also be called as a User Equipment (UE), and it may be a terminal side device such as a mobile phone, a tablet personal computer, a laptop computer, a Personal Digital Assistant (PDA), a Mobile Internet Device (MID), a wearable device or a vehicle-mounted device. It should be appreciated that, the specific type of the terminal 31 will not be particularly defined herein. The base station 32 may be a 5$^{th}$-Generation (5G) base station or a future base station (e.g., gNB, 5G NR NB), or a base station in the other communication system (e.g., eNB, Wireless Local Area Network (WLAN) access point, or another access point). The base station may be called as node B, evolved node B, access point, Base Transceiver Station (BTS), radio base station, radio transceiver, Basic Service Set (BSS), Extended service Set (ESS), node B, evolved node B (eNB), home node B, evolved home node B, WLAN access point, WiFi node or any other appropriate term in the field. The base station shall not be limited to a specific technical term, as long as a same technical effect is achieved. It should be appreciated that, merely the base station in the NR system is taken as an example in the embodiments of the present disclosure, but a specific type of the base station will not be particularly defined herein.

The base station 32 may communicate with the terminal 31 under the control of a base station controller. In various examples, the base station controller may be a part of a core network or some base stations. Some base stations may exchange control information or user data with the core network through backhaul. In some examples, some of the base stations may directly or indirectly communicate with each other through a backhaul link, and the backhaul link may be a wired or wireless communication link. The wireless communication system may support operations on a plurality of carriers (waveform signals at different frequencies). A multi-carrier transmitter may transmit modulated signals on the plurality of carriers simultaneously. For example, each communication link may be a multi-carrier signal modulated using various radio technologies. Each modulated signal may be transmitted on different carriers and may carry control information (e.g., reference signal or control channel), overhead information, data, etc.

The base station 32 may communicate with the terminal 31 in a wireless manner via an antenna of one or more access points. Each base station may provide a communication coverage at a corresponding coverage region. A coverage region for an access point may be a sector merely constituting a part of the coverage region. The wireless communication system may include various base stations (e.g., macro base station, micro base station, or pico base station). The base station may also use different radio technologies, e.g., cellular or WLAN radio access technology. The base station may be associated with same or different access network or operator deployments. The coverage regions of different base stations (including the coverage regions of the base stations of a same type or different types, the coverage regions using same or different radio technologies, or the coverage regions belonging to same or different access networks) may overlap each other.

A communication link in the wireless communication system may include an uplink for carrying uplink (UL) transmission (e.g., from the terminal 31 to the base station 32), or a terminal for carrying downlink (DL) transmission (e.g., from the base station 32 to the terminal 31). The UL transmission may also be called as reverse link transmission, and the DL transmission may also be called as forward link transmission. The downlink transmission may be performed using a licensed frequency band, a non-licensed frequency band or both. Similarly, the uplink transmission may be performed using the licensed frequency band, the non-licensed frequency band or both.

Based on the above description, the WUS and the relevant contents have not been discussed currently in the standard. In order to meet different power consumption requirements, the terminal needs to define different states. Hence, there is an urgent need to provide a corresponding scheme for switching or updating different states and performing configurations therefor.

An object of the present disclosure is to provide a power-saving state switching method, so as to define different power consumption modes of a terminal, and switch or update different power consumption modes. Through switching the power consumption mode, it is able for the terminal to meet the requirements on data reception as well as the power-saving requirements flexibly, thereby to further reduce the power consumption of the terminal.

To be specific, considering different power consumption requirements of the terminal, in the embodiments of the present disclosure, the terminal may be configured to be in different power consumption modes. The terminal (UE) may support two or more power consumption modes, which includes a normal power consumption mode and a low power consumption mode. Further, the low power consumption mode may include at least one power-saving mode and/or at least one sleep mode. Here, the power consumption of the terminal in the normal power consumption mode may be greater than that in the low power consumption mode, the power consumption of the terminal in the power-saving mode may be greater than that in the sleep mode, and the power consumption of the terminal in different power-saving modes or sleep modes may be different from each other.

To be specific, as compared with the normal power consumption mode, in the power-saving mode, the terminal may receive, e.g., a PDCCH, a Physical Downlink Shared Channel (PDSCH), a paging message, a CSI-RS, a CRS, an SSB or a PSS/SSS in a power-saving state through, e.g., reducing a bandwidth for detecting the PDCCH, reducing the quantity of times of PDCCH blind detection or PDCCH blind detection complexity, or reducing the quantity of reception antennae. For another example, the terminal may further be in the more power-saving sleep mode, and the sleep mode may include a light sleep mode and a deep sleep mode.

For ease of understanding, the power consumption modes probably involved in the embodiments of the present disclosure will be described hereinafter.

The respective power consumptions of the terminal in different power consumption modes may be different from each other. The power consumption may also be called as energy consumption, energy loss, or power loss.

The normal power consumption mode may be a mode where the terminal receives first data, e.g., the PDCCH, the SS, the PDSCH, the CSI-RS or the CRS, based on a first power consumption. Naturally, the terminal may also receive the other signals, which will not be further particularly defined herein. Correspondingly, the first power consumption may be a power consumption for receiving the PDCCH, the SS, the PDSCH, the CSI-RS, the CRS or the other signals, which will not be further particularly defined herein.

The power-saving mode may be a mode where the terminal receives second data, e.g., the WUS, the PDCCH, the SS, the PDSCH, the CSI-RS or the CRS, based on a second power consumption smaller than the first power consumption. Naturally, the terminal may also receive the other signals, which will not be further particularly defined herein. The second power consumption may be a power consumption for receiving the WUS, the PDCCH, the SS, the PDSCH, the CSI-RS, the CRS or the other signals, which will not be further particularly defined herein.

Here, the second power consumption may be smaller than the first power consumption. As compared with the normal power consumption mode, the terminal may reduce the bandwidth for the detection of the PDCCH or reduce the PDCCH blind detection complexity so as to enable the second power consumption to be smaller than the first power consumption, or reduce the quantity of reception times of the PDCCH, receive data through a part of reception antennae, or reduce the quantity of times of RRM measurement so as to reduce the power consumption. In the embodiments of the present disclosure, any other ways may also be adopted so as to reduce the power consumption, which will not be further particularly defined herein.

To be specific, the power-saving mode may include at least one of a first power-saving mode based on the reception of a WUS, a second power-saving mode where the bandwidth for the PDCCH detection and/or the quantity of times of PDCCH blind detection are reduced, a third power-saving mode where the quantity of times of RRM measurement is reduced, a fourth power-saving mode where the quantity of reception antennae is reduced, and a fifth power-saving mode where a transmission bandwidth and/or a reception bandwidth are adjusted.

The sleep mode may be a mode where the power consumption of the terminal is smaller than a predetermined power consumption threshold, or a mode where the terminal does not transmit or receive any data, or a mode where all or parts of components of the terminal are disabled. To be specific, the sleep mode may include at least one of a first sleep mode (also called as light sleep mode in the context) and a second sleep mode (also called as deep sleep mode in the context).

The first sleep mode may be a sleep mode where the terminal is in downlink synchronization with a serving base station, and the second sleep mode may be a sleep mode where the terminal does not need to be in downlink synchronization with the serving base station.

Alternatively, the first sleep mode may be a power consumption mode where the terminal is switched from the first sleep mode to the power-saving mode or a switching time of the normal power consumption mode is smaller than or equal to a first time threshold, and the second sleep mode may be a power consumption mode where the terminal is switched from the second sleep mode to the power-saving mode or the switching time of the normal power consumption mode is greater than or equal to a second time threshold which is greater than or equal to the first time threshold. Here, the first time threshold and the second time threshold may each be a positive real number greater than or equal to 0.

Alternatively, the first sleep mode may be a power consumption mode where the components of the terminal at a proportion smaller than or equal to a first proportion are disabled, and the second sleep mode may be a power consumption mode where the components of the terminal at a proportion greater than or equal to a second proportion, which is greater than or equal to the first proportion, are disabled. Here, the first proportion and the second proportion may each be a real number greater than 0 and smaller than or equal to 1. The components of the terminal may include, but not limited to, a radio frequency module, an intermediate frequency module and a baseband module.

Alternatively, the first sleep mode may be a power consumption mode where fine synchronization or time-frequency tracking needs to be performed after the terminal has been switched from the first sleep mode to the normal power consumption mode or the power-saving mode so as to receive Downlink Control Information (DCI) or service information, and the second sleep mode may be a power consumption mode where cell identification needs to be performed after the terminal has been switched from the second sleep mode to the normal power consumption mode or the power-saving mode so as to receive the DCI or the service information. The cell identification may include at least one of the following behaviors: rough synchronization and fine synchronization, reading a broadcast message, cell selection, and reading a system message.

For example, in the first sleep mode, the terminal may be switched from the first sleep mode to the power-saving mode within the first time threshold which is a positive real number greater than or equal to 0; or in the first sleep mode, the power consumption of the terminal may be smaller than or equal to a first power consumption threshold which is a real number; or in the first sleep mode, the terminal may be in downlink synchronization with the serving base station which is a base station providing the system message, a control message or data information to the terminal; or in the first sleep mode, at least one of the radio frequency module, the intermediate frequency module and the baseband module of the terminal is maintained in an operating mode; or the terminal may perform at least one of fine synchronization, the reception of the PDCCH and the reception of the PDSCH after the terminal has been woken up from the first sleep mode. The fine synchronization may include that the terminal receives a CRS for a synchronization operation, or the terminal receives a CSI-RS or a TRS for the synchronization operation, or the terminal performs a time-frequency tracking operation or other synchronization operations, which will not be further particularly defined herein.

In the second sleep mode, the terminal may be switched from the sleep mode to the power-saving mode within the second time threshold which is a positive real number greater than or equal to 0 and which is greater than or equal to the first power consumption threshold; or in the second sleep mode, the power consumption of the terminal may be smaller than or equal to a second power consumption threshold which is a real number and which is greater than or equal to the first power consumption threshold; or in the second sleep mode, the terminal may lose its downlink synchronization with the serving base station which is a base station providing the system message, the control message or the data information to the terminal; or in the second sleep mode, at least one of the radio frequency module, the intermediate frequency module and the baseband module of the terminal is maintained in a non-operating mode (i.e., in an off state); or the terminal may perform cell identification (which specifically includes at least one of synchronization, serving cell selection, reading the broadcast message, reading the system message update, fine synchronization, the reception of the PDCCH and the reception of the PDSCH) after the terminal has been woken up from the second sleep mode. The fine synchronization may include that the terminal receives the CRS for the synchronization operation, or the terminal receives the CSI-RS or the TRS for the synchronization operation, or the terminal performs the time-frequency tracking operation or some other synchronization operations, which will not be further particularly defined herein.

The power-saving state switching method will be described hereinafter in terms of a base station side and a terminal side.

As shown in FIG. 4, the present disclosure provides in some embodiments a power-saving state switching method for a base station side, which includes Step 41 of configuring, by a base station, a first power consumption mode of a terminal at a first time point, and transmitting, by a base station, configuration information of the first power consumption mode to the terminal. Two or more power consumption modes may be supported by the terminal.

Here, the base station may configure an initial power consumption mode of the terminal, or update a power consumption mode of the terminal. To be specific, the first power consumption mode may be any power consumption mode supported by the terminal, e.g., a normal power consumption mode, any power-saving mode or any sleep mode.

Through the above step, it is able for the base station in the embodiment of the present disclosure to configure the power consumption mode of the terminal, thereby to switch among different power consumption modes.

In Step 41, when the first power consumption mode is the normal power consumption mode or the power-saving mode, the first power consumption mode may be configured in any one of the following ways.

1) The base station may configure the power consumption mode of the terminal in accordance with measurement information reported by the terminal.

The measurement information may include a measurement value of a target signal. The measurement value may be Reference Signal Received Power (RSRP), Reference Signal Received Quality (RSRQ), Reference signal Strength Indicator (RSSI), or Signal to Interference plus Noise Ratio (SINR). The target signal may be a WUS, an on-demand RS, a PSS/SSS, an SSB, a CSI-RS or a CRS. The on-demand RS may be an aperiodic signal, or a reference signal with a pre-defined transmission pattern, and it may be used for the rapid synchronization and/or RRM measurement of the terminal. For example, when the measurement value is greater than or equal to a first measurement value threshold, the base station may configure the normal power consumption mode for the terminal, and when the measurement value is smaller than the first measurement value threshold, the base station may configure a certain power-saving mode for the terminal. Naturally, in a possible embodiment of the present disclosure, when the measurement value is smaller than the first measurement value threshold, the base station may also configure the normal power consumption mode for the terminal.

2) The base station may configure the first power consumption mode of the terminal in accordance with capability information reported by the terminal.

To be specific, the capability information reported by the terminal may include a capability of a receiver of the terminal, e.g., a terminal capability of supporting the reception through a part of a bandwidth, or terminal capability of supporting to disable a part of radio frequency links, or a terminal capability of supporting to reduce the quantity of times of RRM measurement. Upon the receipt of the capability information, e.g., the terminal capability of supporting the reception through a part of the bandwidth, in a possible embodiment of the present disclosure, the base station may configure the first power consumption mode of the terminal as the normal power consumption mode, and when the terminal fails to support the reception through a part of the bandwidth, the base station may configure the first power consumption mode of the terminal as the power-saving mode. In a possible embodiment of the present disclosure, upon the receipt of the capability information, e.g., the terminal capability of supporting the reception through a part of the bandwidth, the base station may also configure the first power consumption mode of the terminal as the power-saving mode.

3) The base station may configure the first power consumption mode of the terminal in accordance with configuration information of a reception antenna of the terminal.

For example, when the terminal supports the operation through a part of the reception antennae, the base station may configure the first power consumption mode as the power-saving mode, and when the terminal fails to support the operation through a part of the reception antennae, the base station may configure the first power consumption mode of the terminal as the normal power consumption mode. In a possible embodiment of the present disclosure, when the terminal supports the operation through a part of the reception antennae, the base station may configure the first power consumption mode as the normal power consumption mode, and when the terminal fails to support the operation through a part of the reception antennae, the base station may configure the first power consumption mode of the terminal as the power-saving mode.

Furthermore, the base station may further configure a timer corresponding to the first power consumption mode, and the timer is used to notify the terminal to, when the timer reaches a predetermined time value, configure a power consumption mode of the terminal as another power consumption mode being different from the first power consumption mode.

4) The base station may randomly select the normal power consumption mode or one of the power-saving modes as the first power consumption mode. Here, preferably, the base station may uniformly and randomly select and configure the normal power consumption mode or a power consumption mode in the power-saving modes as the first power consumption mode.

5) The base station may configure the first power consumption mode of the terminal in accordance with a configuration history of the power consumption mode of the terminal.

6) The base station may configure the first power consumption mode of the terminal in accordance with a service type of the terminal.

As shown in the above configuration modes 4) to 6), the base station may configure the power consumption mode of the terminal through random selection, or in accordance with a previous power consumption mode, or in accordance with a historical power consumption mode of the terminal. For example, the base station may randomly select any of the historical power consumption modes of the terminal, or select a power consumption mode in the historical power consumption modes whose configuration proportion is greater than a first configuration threshold. Alternatively, the base station may configure the power consumption mode in accordance with the service type of the terminal. For a service where a real-time property and/or a data rate are highly demanded, e.g., a video service, a voice service or an on-line game, the base station may configure the first power consumption mode as the normal power consumption mode, and for a service where the real-time property and/or the data rate are not highly demanded, e.g., a http service or a ftp service, the base station may configure the power-saving mode for the terminal, or configure the normal power consumption mode for the terminal so as to improve the user experience. Naturally, other configuration methods may also be adopted, which will not be further particularly defined herein.

When the first power consumption mode is the sleep mode, in Step 41, the first power consumption mode may be configured in any one of the following ways.

1) The base station may configure the first power consumption mode of the terminal in accordance with the capability information reported by the terminal.

Here, the base station may configure the first power consumption mode as one sleep mode supported by the terminal in accordance with the capability information reported by the terminal. Furthermore, the base station may configure a timer corresponding to the first power consumption mode, and the timer is used to, when the timer reaches a predetermined time value, configure the power consumption mode of the terminal as a sleep mode being different from the first power consumption mode.

2) The base station may randomly select and configure one sleep mode as the first power consumption mode. Here, preferably, the base station may uniformly and randomly select the power consumption mode in the sleep modes as the first power consumption mode.

3) The base station may configure the first power consumption mode of the terminal in accordance with a configuration history of the power consumption of the terminal.

4) The base station may configure the first power consumption mode of the terminal in accordance with a service type of the terminal.

As shown in the above configuration modes 2) to 4), the base station may configure the sleep mode of the terminal through random selection, or in accordance with a previous sleep mode, or in accordance with a historical sleep mode of the terminal. For example, the base station may randomly select any of the historical sleep configurations of the terminal, or select a sleep mode configuration in the historical sleep configurations of the terminal whose proportion is greater than a second configuration threshold. Alternatively, the base station may implement the configuration in accordance with the service type of the terminal. For a service where a real-time property and/or a data rate are highly demanded, e.g., a video service, a voice service or an on-line game service, the base station may configure the first sleep mode for the terminal, and for a service where the real-time property and/or the data rate are not highly demanded, e.g., a http service or a ftp service, the base station may configure the second sleep mode for the terminal, or configure the first sleep mode for the terminal so as to improve the user experience with respect to the service. Naturally, any other configuration methods may also be adopted, which will not be further particularly defined herein.

In Step 41, the transmitting, by the base station, the configuration information of the first power consumption mode to the terminal may include: transmitting, by the base station, the configuration information of the first power consumption mode through Radio Resource Control (RRC) signaling and/or Medium Access Control (MAC) layer Control Element (CE) wherein the configuration mode is a static/semi-static configuration mode; or transmitting, by the base station, the configuration information of the first power consumption mode through DCI wherein the configuration mode is a dynamic configuration mode; or transmitting, by the base station, the configuration information of the first power consumption mode through a Radio Network Temporary Identity (RNTI)-scrambled PDCCH. Here, a correspondence between an RNTI and the power consumption mode may be pre-defined, and the power consumption mode corresponding to the RNTI may be notified to the terminal in accordance with the RNTI for scrambling the PDCCH.

Prior to Step 41, the power-saving state switching method may further include Step 40 of configuring, by the base station, a second power consumption mode of the terminal at a second time point, and transmitting, by the base station, configuration information of the second power consumption mode to the terminal.

Here, the first time point and the second time point may each be a pre-agreed configuration time, or a static/semi-static configuration time, or a dynamic configuration time. The first and second power consumption modes may be supported by the terminal, and they may be the same, or different from each other.

Preferably, the second power consumption mode may be different from the first power consumption mode. For example, the second power consumption mode and the first power consumption mode may be two different modes in the normal power consumption mode and the power-saving modes, or two different modes in the sleep modes. Alternatively, the second power consumption mode may be one of the normal power consumption mode and the power-saving modes, and the first power consumption mode may be one of the sleep modes; or the second power consumption mode may be one of the sleep modes, and the first power consumption mode may be one of the normal power consumption mode and the power-saving modes.

Through the above Steps 40 and 41, it is able to update the power-saving state of the terminal, e.g., configure the second power consumption mode for the terminal at the second time point, and configure the first power consumption mode for the terminal at the first time point.

In a possible embodiment of the present disclosure, when the second power consumption mode is the normal power consumption mode or the power-saving mode and the first power consumption mode is the normal power consumption mode or the power-saving mode, or when the second power consumption mode is the sleep mode and the first power consumption mode is the sleep mode, in Step 40, the configuring the second power consumption mode of the terminal may include configuring, by the base station, a timer corresponding to the second power consumption mode, wherein the timer is used to notify the terminal to, when the timer reaches a predetermined time value, proceed to Step 41 of configuring the first power consumption mode of the terminal.

In a possible embodiment of the present disclosure, when the second power consumption mode is the normal power consumption mode or the power-saving mode and the first power consumption mode is the sleep mode, in Step 41, the configuring the first power consumption mode of the terminal may further include: configuring an end time point for the transmission of downlink data for the terminal, the end time point being used to indicate a time point at which the terminal is switched to the first power consumption mode, and the end time point being represented by at least one of a boundary of a subframe, a boundary of a slot and a boundary of an Orthogonal Frequency Division Multiplexing (OFDM) symbol; or configuring a first sleep time point at which the terminal is switched to the first power consumption mode, the first sleep time point being the end time point for the transmission of the downlink data for the terminal, or a sum of the end time point and a predetermined first time window, or a sum of a transmission time point for the transmission of the downlink data for the terminal and a predetermined second time window, and the first sleep time point being represented by at least one of a boundary of a subframe, a boundary of a slot and a boundary of an OFDM symbol; or configuring a second sleep time point at which the terminal is switched to the first power consumption mode, the second sleep time point being a time point at which a timer for the transmission of the downlink data for the terminal has expired.

In the method according to the embodiments of the present disclosure, the base station may also transmit a power-saving signal for waking up the terminal in accordance with a predetermined transmission mode, and the predetermined transmission mode may include a periodic transmission mode and an aperiodic on-demand transmission mode. The predetermined transmission mode may be configured by the base station in accordance with the measurement information or capability information reported by the terminal, or determined by the terminal itself.

The power-saving state switching method at the base station side has been described hereinabove, and a power-saving state switching method at a terminal side will be described hereinafter.

As shown in FIG. 5, the present disclosure further provides in some embodiments a power-saving state switching method at a terminal side, which includes Step 51 of configuring, by a terminal, a power consumption mode of the terminal as a first power consumption mode at a first time point.

Here, two or more power consumption modes may be supported by the terminal. The types of the power consumption modes and the description thereof may refer to those mentioned hereinabove, and thus will not be repeated herein for conciseness.

In the embodiments of the present disclosure, when the first power consumption mode is the normal power consumption mode or the power-saving mode, in Step 51, the power consumption mode of the terminal may be configured by the terminal in one of the following ways.

1) The terminal may receive configuration information of the first power consumption mode from a base station, and configure the power consumption mode of the terminal as the first power consumption mode in accordance with the configuration information. To be specific, the way of configuring the first power consumption mode by the base station may refer to that mentioned hereinabove, and thus will not be repeated herein 2) The terminal may determine the first power consumption mode in accordance with measurement value of a target signal, and configure the power consumption mode of the terminal as the first power consumption mode.

Here, the measurement information may include a measurement value of a target signal. The measurement value may be RSRP, RSRQ, RSSI or SINR, and the target signal may be a WUS, an on-demand RS, a PSS/SSS, an SSB, a CSI-RS or a CRS. The on-demand RS may be an aperiodic signal, or a reference signal with a predefined transmission pattern, and it may be used for the rapid synchronization and/or RRM measurement of the terminal. For example, when the measurement value is greater than or equal to a first measurement value threshold, the terminal may configure the power consumption mode of the terminal as the normal power consumption mode; and when the measurement value is smaller than the first measurement value threshold, the terminal may configure a certain power-saving mode. Naturally, in a possible embodiment of the present disclosure, when the measurement value is smaller than the first measurement value threshold, the terminal may also configure the power consumption mode of the terminal as the normal power consumption mode.

3) The terminal may determine the first power consumption mode in accordance with its own capability information, and configure the power consumption mode of the terminal as the first power consumption mode.

To be specific, the capability information of the terminal may include a capability of a receiver of the terminal, e.g., a capability of the terminal for supporting the reception through a part of a bandwidth, or a capability of the terminal for supporting to disable a part of radio frequency links, or a capability of the terminal for supporting to reduce the quantity of times of RRM measurement. In a possible embodiment of the present disclosure, when the terminal has the capability for supporting the reception through a part of the bandwidth, the terminal may determine the first power consumption mode as the normal power consumption mode, and when the terminal fails to support the reception through a part of the bandwidth, the terminal may determine the first power consumption mode as the power-saving mode. In a possible embodiment of the present disclosure, when the terminal has the capability for supporting the reception through a part of the bandwidth, the terminal may also determine the first power consumption mode as the power-saving mode.

4) The terminal may determine the first power consumption mode in accordance with configuration information of its own reception antennae, and configure the power consumption mode of the terminal as the first power consumption mode.

For example, when the terminal supports the operation through a part of the reception antennae, the terminal may determine the first power consumption mode as the power-saving mode, and when the terminal fails to support the operation through a part of the reception antennae, the terminal may determine the first power consumption mode of the terminal as the normal power consumption mode. In a possible embodiment of the present disclosure, when the terminal supports the operation through a part of the reception antennae, the terminal may determine the first power consumption mode as the normal power consumption mode, and when the terminal fails to support the operation through a part of the reception antennae, the terminal may determine the first power consumption mode as the power-saving mode.

Furthermore, the terminal may configure a timer corresponding to the first power consumption mode, wherein the timer is used to notify the terminal to, when the timer reaches a predetermined time value, configure a power consumption mode of the terminal as another power consumption mode being different from the first power consumption mode.

5) The terminal may randomly select and configure one of the normal power consumption mode and the power-saving modes as the first power consumption mode. Here, preferably, the terminal may uniformly and randomly select and configure a power consumption mode from the normal power consumption mode and the power-saving modes as the first power consumption mode.

6) The terminal may configure the first power consumption mode of the terminal in accordance with a configuration history of the power consumption mode of the terminal.

7) The terminal may configure the first power consumption mode of the terminal in accordance with a service type of the terminal.

As shown in the above configuration modes 4) to 6), the terminal may configure the power consumption mode of the terminal through random selection, or in accordance with a previous power consumption mode, or in accordance with a historical power consumption mode of the terminal. For example, the terminal may randomly select any of the historical power consumption modes of the terminal, or select and configure a power consumption mode in the historical power consumption modes whose configuration proportion is greater than a first configuration threshold. Alternatively, the base station may configure the power consumption mode in accordance with the service type of the terminal. For a service where a real-time property and/or a data rate are highly demanded, e.g., a video service, a voice service or an on-line game, the terminal may configure the first power consumption mode as the normal power consumption mode, and for a service where the real-time property and/or the data rate are not highly demanded, e.g., a http service or a ftp service, the terminal may configure the power-saving mode for the terminal, or configure the normal power consumption mode for the terminal so as to improve the user experience. Naturally, any other configuration methods may also be adopted, which will not be further particularly defined herein.

When the first power consumption mode is the sleep mode, in Step 51, the first power consumption mode may be configured in any one of the following ways.

1) The terminal may configure the power consumption mode of the terminal as the first power consumption mode in accordance with configuration information of the first power consumption mode from the base station. To be specific, the way of configuring the first power consumption mode by the base station may refer to that mentioned hereinabove, and thus will not be particularly defined herein.

2) The terminal may determine the first power consumption mode in accordance with its own capability information, and configure the power consumption mode of the terminal as the first power consumption mode.

Furthermore, the terminal may configure a timer corresponding to the first power consumption mode, wherein the timer is used to notify the terminal to, when the timer reaches a predetermined time value, configure the power consumption mode of the terminal as a power consumption mode different from the first power consumption mode.

3) The terminal may determine the first power consumption mode in accordance with configuration information of its own reception antennae, and configure the power consumption mode of the terminal as the first power consumption mode.

4) The terminal may randomly select and configure one of the sleeping modes as the first power consumption mode.

5) The terminal may configure the first power consumption mode of the terminal in accordance with a configuration history of the power consumption mode of the terminal.

6) The terminal may configure the first power consumption mode of the terminal in accordance with a service type of the terminal.

As shown in the above configuration modes 4) to 6), the terminal may configure the sleep mode of the terminal through random selection, or in accordance with a previous sleep mode, or in accordance with a historical sleep mode of the terminal. For example, the terminal may randomly select any of the historical sleep modes of the terminal, or select a sleep mode in the historical sleep modes whose configuration proportion is greater than a second configuration threshold. Alternatively, the terminal may configure the sleep mode in accordance with the service type of the terminal. For a service where a real-time property and/or a data rate are highly demanded, e.g., a video service, a voice service or an on-line game service, the terminal may configure the first sleep mode for the terminal, and for a service where the real-time property and/or the data rate are not highly demanded, e.g., a http service or a ftp service, the terminal may configure the second sleep mode for the terminal, or configure the first sleep mode for the terminal so as to improve the user experience with respect to the service. Naturally, any other configuration methods may also be adopted, which will not be further particularly defined herein.

In Step 51, the receiving, by the terminal, the configuration information of the first power consumption mode from the base station may include: receiving, by the terminal, the configuration information of the first power consumption mode from the base station through RRC signaling and/or an MAC layer CE; or receiving, by the terminal, the configuration information of the first power consumption mode from the base station through DCI; or receiving, by the terminal, the configuration information of the first power consumption mode from the base station through an RNTI-scrambled PDCCH. Here, a correspondence between an RNTI and the power consumption mode may be pre-defined, and the terminal may determine the power consumption mode corresponding to the RNTI as the first power consumption mode in accordance with the RNTI for scrambling the PDCCH.

Prior to Step 51, the power-saving state switching method may further include Step 50 of configuring, by the terminal, the power consumption mode of the terminal as a second power consumption mode at a second time point, and the second power consumption mode may be different from the first power consumption mode.

Here, the first time point and the second time point may each be a pre-agreed configuration time, or a static/semi-static configuration time, or a dynamic configuration time. The first and second power consumption modes may be two power consumption modes supported by the terminal, and they may be the same, or different from each other. The dynamic configuration may include transmitting, by the base station, the configuration information of the first power consumption mode through DCI, or transmitting, by the base station, the configuration information of the first power consumption mode through an RNTI-scrambled PDCCH.

Preferably, the second power consumption mode may be different from the first power consumption mode. For example, the second power consumption mode and the first power consumption mode may be two different modes in the normal power consumption mode and the power-saving modes, or two different modes in the sleep modes. Alternatively, the second power consumption mode may be one of the normal power consumption mode and the power-saving modes, and the first power consumption mode may be one of the sleep modes; or the second power consumption mode may be one of the sleep modes, and the first power consumption mode may be one of the normal power consumption mode and the power-saving modes.

Through the above Steps 50 and 51, it is able to update the power-saving state of the terminal, e.g., configure the second power consumption mode for the terminal at the second time point, and configure the first power consumption mode for the terminal at the first time point.

In a possible embodiment of the present disclosure, when the second power consumption mode is the normal power consumption mode or the power-saving mode and the first power consumption mode is the normal power consumption mode or the power-saving mode, or when the second power consumption mode is the sleep mode and the first power consumption mode is the sleep mode, in Step 50, the configuring the second power consumption mode of the terminal may include configuring a timer corresponding to the second power consumption mode in accordance with a configuration from the base station, wherein the timer corresponding to the second power consumption mode is used to notify the terminal to, when the timer reaches a predetermined time value, proceed to Step 51 of configuring the first power consumption mode.

In a possible embodiment of the present disclosure, when the second power consumption mode is the normal power consumption mode or the power-saving mode and the first power consumption mode is the sleep mode, in Step 51, the configuring the first power consumption mode may further include: configuring an end time point for the transmission of downlink data for the terminal, the end time point being used to indicate a time point at which the terminal is switched to the first power consumption mode, and the end time point being represented by at least one of a boundary of a subframe, a boundary of a slot and a boundary of an OFDM symbol; or configuring a first sleep time point at which the terminal is switched to the first power consumption mode, the first sleep time point being the end time point for the transmission of the downlink data for the terminal, or a sum of the end time point and a predetermined first time window, or a sum of a transmission time point for the transmission of the downlink data for the terminal and a predetermined second time window, and the first sleep time point being represented by at least one of a boundary of a subframe, a boundary of a slot and a boundary of an OFDM symbol; or configuring a second sleep time point at which the terminal is switched to the first power consumption mode, the second sleep time point being a time point at which a timer for the transmission of the downlink data for the terminal has expired.

In the method according to the embodiments of the present disclosure, the terminal may also receive a power-saving signal for waking up the terminal from the base station in accordance with a predetermined transmission mode, and the predetermined transmission mode may include a periodic transmission mode and an aperiodic on-demand transmission mode. The predetermined transmission mode may be configured by the base station in accordance with the measurement information or capability information reported by the terminal, or determined by the terminal itself.

Based on the above methods, the present disclosure further provides in some embodiments devices for implementing the above-mentioned methods.

As shown in FIG. 6, the present disclosure further provides in some embodiments a base station 600, which includes a processor 601, a transceiver 602, a memory 603, and a bus interface.

In the embodiments of the present disclosure, the base station 600 may further include a computer program stored in the memory 603 and executed by the processor 601.

The processor 601 is used to read the computer program stored in the memory, so as to configure a first power consumption mode of a terminal at a first time point. Two or more power consumption modes may be supported by the terminal. The transceiver 602 is used to transmit configuration information of the first power consumption mode to the terminal.

In FIG. 6, bus architecture may include a number of buses and bridges connected to each other, so as to connect various circuits for one or more processors represented by the processer 601 and one or more memories represented by the memory 603. In addition, as is known in the art, the bus architecture may be used to connect various other circuits, such as a circuit for a peripheral device, a circuit for a voltage stabilizer and a power management circuit, which will not be further defined herein. The bus interface may be provided, and the transceiver 602 may include a plurality of elements, i.e., a transmitter and a receiver for communication with any other devices over a transmission medium.

The processor 601 may take charge of managing the bus architecture as well as general processings. The memory 603 may store therein data for the operation of the processor 601.

In a possible embodiment of the present disclosure, the first power consumption mode may be a normal power consumption mode or a power-saving mode. The processor 601 is further used to: configure the power consumption mode of the terminal in accordance with measurement information reported by the terminal, the measurement information including a measurement value of a target signal; or configure the first power consumption mode of the terminal in accordance with capability information reported by the terminal; or configure the first power consumption mode of the terminal in accordance with configuration information of a reception antenna of the terminal; or randomly select one power consumption mode from the normal power consumption mode and the power-saving modes as the first power consumption mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, the first power consumption mode may be a sleep mode. The processor 601 is further used to: configure the first power consumption mode of the terminal in accordance with capability information reported by the terminal; or randomly select one sleep mode as the first power consumption mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, the processor 601 is further used to, prior to configuring the first power consumption mode of the terminal, configure a second power consumption mode of the terminal at a second time point, the second power consumption mode may be different from the first power consumption mode, and the transceiver is further used to transmit configuration information of the second power consumption mode to the terminal.

In a possible embodiment of the present disclosure, the first time point and the second time point may each be a pre-agreed configuration time, or a static/semi-static configuration time, or a dynamic configuration time.

In a possible embodiment of the present disclosure, the second power consumption mode may be a normal power consumption mode or a power-saving mode, or the second power consumption mode may be a sleep mode.

In a possible embodiment of the present disclosure, when the second power consumption mode is the normal power consumption mode or the power-saving mode and the first power consumption mode is the normal power consumption mode or the power-saving mode, or when the second power consumption mode is the sleep mode and the first power consumption mode is the sleep mode, the processor 601 is further used to configure a timer corresponding to the second power consumption mode, wherein the timer corresponding to the second power consumption mode is used to notify the terminal to, when the timer reaches a predetermined time value, configure the first power consumption mode of the terminal.

In a possible embodiment of the present disclosure, when the second power consumption mode is the normal power consumption mode or the power-saving mode and the first power consumption mode is the sleep mode, the processor 601 is further used to: configure an end time point for the transmission of downlink data for the terminal, the end time point being used to indicate a time point at which the terminal is switched to the first power consumption mode, and the end time point being represented by at least one of a boundary of a subframe, a boundary of a slot and a boundary of an OFDM symbol; or configure a first sleep time point at which the terminal is switched to the first power consumption mode, the first sleep time point being the end time point for the transmission of the downlink data for the terminal, or a sum of the end time point and a predetermined first time window, or a sum of a transmission time point for the transmission of the downlink data for the terminal and a predetermined second time window, and the first sleep time point being represented by at least one of a boundary of a subframe, a boundary of a slot and a boundary of an OFDM symbol; or configure a second sleep time point at which the terminal is switched to the first power consumption mode, the second sleep time point being a time point at which a timer for the transmission of the downlink data for the terminal has expired.

In a possible embodiment of the present disclosure, the transceiver 602 is further used to transmit a power-saving signal for waking up the terminal in accordance with a predetermined transmission mode, and the predetermined transmission mode may include a periodic transmission mode and an aperiodic on-demand transmission mode. The predetermined transmission mode may be configured by the base station in accordance with the measurement information or capability information reported by the terminal, or determined by the terminal itself.

In a possible embodiment of the present disclosure, the transceiver 602 is further used to: transmit the configuration information of the first power consumption mode through RRC signaling and/or an MAC layer CE; or transmit the configuration information of the first power consumption mode through an indication of DCI; or transmit the configuration information of the first power consumption mode through an RNTI-scrambled PDCCH.

As shown in FIG. 7, the present disclosure further provides in some embodiments a base station 70 which includes a first configuration unit 71 used to configure a first power consumption mode of a terminal at a first time point, and transmit configuration information of the first power consumption mode to the terminal. Two or more power consumption modes may be supported by the terminal.

In a possible embodiment of the present disclosure, the first power consumption mode may be a normal power consumption mode or a power-saving mode. The first configuration unit 71 is further used to: configure the power consumption mode of the terminal in accordance with measurement information reported by the terminal, the measurement information including a measurement value of a target signal; or configure the first power consumption mode of the terminal in accordance with capability information reported by the terminal; or configure the first power consumption mode of the terminal in accordance with configuration information of a reception antenna of the terminal; or randomly select one power consumption mode from the normal power consumption mode and the power-saving modes as the first power consumption mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, the first power consumption mode may be a normal power consumption mode or a power-saving mode. The first configuration unit 71 is further used to: configure the first power consumption mode of the terminal in accordance with capability information reported by the terminal; or randomly select one sleep mode as the first power consumption mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, the base station further includes a second configuration unit used to, prior to configuring the first power consumption mode of the terminal, configure a second power consumption mode of the terminal at a second time point and transmit configuration information of the second power consumption mode to the terminal, and the second power consumption mode may be different from the first power consumption mode.

In a possible embodiment of the present disclosure, the first time point and the second time point may each be a pre-agreed configuration time, or a static/semi-static configuration time, or a dynamic configuration time.

In a possible embodiment of the present disclosure, the second power consumption mode may be a normal power consumption mode or a power-saving mode, or the second power consumption mode may be a sleep mode.

In a possible embodiment of the present disclosure, when the second power consumption mode is the normal power consumption mode or the power-saving mode and the first power consumption mode is the normal power consumption mode or the power-saving mode, or when the second power consumption mode is the sleep mode and the first power consumption mode is the sleep mode, the second configuration unit is further used to configure a timer corresponding to the second power consumption mode, wherein the timer corresponding to the second power consumption mode is used to notify the terminal to, when the timer reaches a predetermined time value, configure the first power consumption mode of the terminal.

In a possible embodiment of the present disclosure, when the second power consumption mode is the normal power consumption mode or the power-saving mode and the first power consumption mode is the sleep mode, the first configuration unit is further used to: configure an end time point for the transmission of downlink data for the terminal, the end time point being used to indicate a time point at which the terminal is switched to the first power consumption mode, and the end time point being represented by at least one of a boundary of a subframe, a boundary of a slot and a boundary of an OFDM symbol; or configure a first sleep time point at which the terminal is switched to the first power consumption mode, the first sleep time point being the end time point for the transmission of the downlink data for the terminal, or a sum of the end time point and a predetermined first time window, or a sum of a transmission time point for the transmission of the downlink data for the terminal and a predetermined second time window, and the first sleep time point being represented by at least one of a boundary of a subframe, a boundary of a slot and a boundary of an OFDM symbol; or configure a second sleep time point at which the terminal is switched to the first power consumption mode, the second sleep time point being a time point at which a timer for the transmission of the downlink data for the terminal has expired.

In a possible embodiment of the present disclosure, the base station may further include a transmission unit used to transmit a power-saving signal for waking up the terminal in accordance with a predetermined transmission mode, and the predetermined transmission mode may include a periodic transmission mode and an aperiodic on-demand transmission mode. The predetermined transmission mode may be configured by the base station in accordance with the measurement information or capability information reported by the terminal, or determined by the terminal itself.

In a possible embodiment of the present disclosure, the transmission unit is further used to: transmit the configuration information of the first power consumption mode through RRC signaling and/or an MAC layer CE; or transmit the configuration information of the first power consumption mode through DCI; or transmit the configuration information of the first power consumption mode through an RNTI-scrambled PDCCH.

Figure 8:
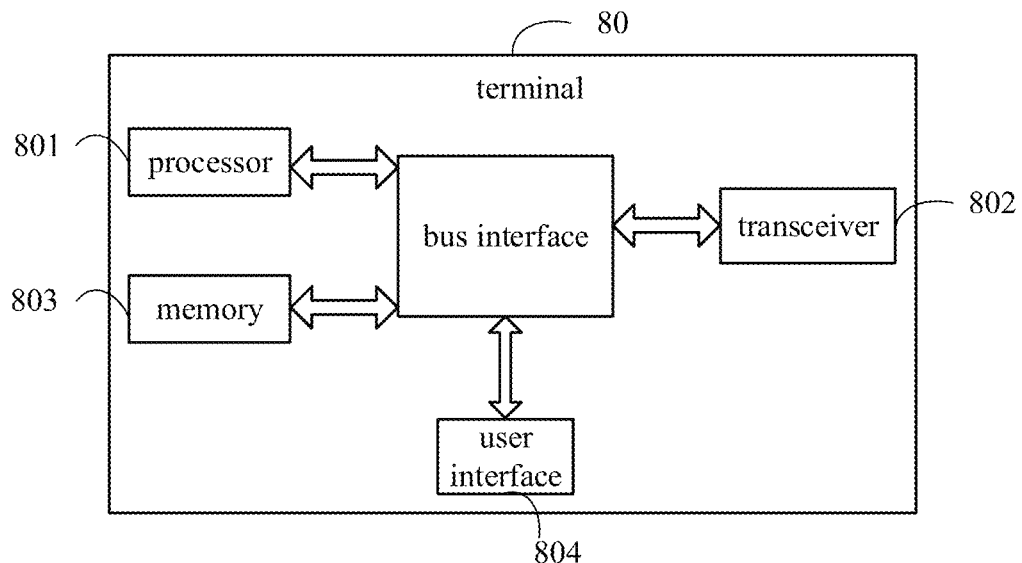
FIG. 8 is a schematic view showing a terminal according to an embodiment of the present disclosure.

As shown in FIG. 8, the present disclosure further provides in some embodiments a terminal 800, which includes a processor 801, a transceiver 802, a memory 803, a user interface 804 and a bus interface.

In the embodiments of the present disclosure, the terminal 800 may further include a computer program stored in the memory 803 and executed by the processor 801. The processor 801 is used to read the computer program stored in the memory so as to configure a power consumption mode of the terminal as a first power consumption mode at a first time point. Two or more power consumption modes may be supported by the terminal.

In FIG. 8, bus architecture may include a number of buses and bridges connected to each other, so as to connect various circuits for one or more processors represented by the processer 801 and one or more memories represented by the memory 803. In addition, as is known in the art, the bus architecture may be used to connect any other circuits, such as a circuit for a peripheral device, a circuit for a voltage stabilizer and a power management circuit, which will not be further defined herein. The bus interface may be provided, and the transceiver 802 may include a plurality of elements, i.e., a transmitter and a receiver for communication with various other devices over a transmission medium. With respect to different terminals, the user interface 804 may also be provided for devices which are to be arranged inside or outside the terminal, and these devices may include but not limited to a keypad, a display, a speaker, a microphone and a joystick.

The processor 801 may take charge of managing the bus architecture as well as general processings. The memory 803 may store therein data for the operation of the processor 801.

In a possible embodiment of the present disclosure, the first power consumption mode may be a normal power consumption mode or a power-saving mode. The processor 801 is further used to: configure the power consumption mode of the terminal as the first power consumption mode in accordance with configuration information of the first power consumption mode from a base station; or determine the first power consumption mode in accordance with a measurement value of a target signal, and configure the power consumption mode of the terminal as the first power consumption mode; or determine the first power consumption mode in accordance with capability information of the terminal, and configure the power consumption mode of the terminal as the first power consumption mode; or determine the first power consumption mode in accordance with configuration information of a reception antenna of the terminal and configure the power consumption mode of the terminal as the first power consumption mode; or randomly select one of the normal power consumption mode and the first power consumption mode as the power-saving mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, when the first power consumption mode is a sleep mode, the processor 801 is further used to: configure the power consumption mode of the terminal as the first power consumption mode in accordance with configuration information of the first power consumption mode from the base station; or determine the first power consumption mode in accordance with capability information of the terminal, and configure the power consumption mode of the terminal as the first power consumption mode; or determine the first power consumption mode in accordance with configuration information of a reception antenna of the terminal, and configure the power consumption mode of the terminal as the first power consumption mode; or randomly select one of the sleep modes as the first power consumption mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, prior to configuring the power consumption mode of the terminal as the first power consumption mode, the processor 801 is further used to configure the power consumption mode of the terminal as a second power consumption mode at a second time point, and the second power consumption mode may be different from the first power consumption mode.

In a possible embodiment of the present disclosure, the first time point and the second time point may each be a pre-agreed configuration time, or a static/semi-static configuration time, or a dynamic configuration time. The dynamic configuration may include transmitting, by the base station, the configuration information of the first power consumption mode through DCI, or transmitting, by the base station, the configuration information of the first power consumption mode through an RNTI-scrambled PDCCH.

In a possible embodiment of the present disclosure, the second power consumption mode may be a normal power consumption mode or a power-saving mode, or the second power consumption mode may be a sleep mode.

In a possible embodiment of the present disclosure, when the second power consumption mode is the normal power consumption mode or the power-saving mode and the first power consumption mode is the normal power consumption mode or the power-saving mode, or when the second power consumption mode is the sleep mode and the first power consumption mode is the sleep mode, the processor 801 is further used to configure a timer corresponding to the second power consumption mode according to a configuration of the base station, wherein the timer corresponding to the second power consumption mode is used to notify the terminal to, when the timer reaches a predetermined time value, configure the first power consumption mode of the terminal.

In a possible embodiment of the present disclosure, when the second power consumption mode is the normal power consumption mode or the power-saving mode and the first power consumption mode is the sleep mode, the processor 801 is further used to: configure an end time point for the transmission of downlink data for the terminal, the end time point being used to indicate a time point at which the terminal is switched to the first power consumption mode, and the end time point being represented by at least one of a boundary of a subframe, a boundary of a slot and a boundary of an OFDM symbol; or configure a first sleep time point at which the terminal is switched to the first power consumption mode, the first sleep time point being the end time point for the transmission of the downlink data for the terminal, or a sum of the end time point and a predetermined first time window, or a sum of a transmission time point for the transmission of the downlink data for the terminal and a predetermined second time window, and the first sleep time point being represented by at least one of a boundary of a subframe, a boundary of a slot and a boundary of an OFDM symbol; or configure a second sleep time point at which the terminal is switched to the first power consumption mode, the second sleep time point being a time point at which a timer for the transmission of the downlink data for the terminal has expired.

In a possible embodiment of the present disclosure, the transceiver 802 is further used to receive a power-saving signal for waking up the terminal from the base station in accordance with a predetermined reception mode, and the predetermined reception mode may include a periodic reception mode and an aperiodic on-demand reception mode. The predetermined reception mode may be configured by the base station in accordance with the measurement information or capability information reported by the terminal, or determined by the terminal itself.

In a possible embodiment of the present disclosure, the transceiver 802 is further used to: receive the configuration information of the first power consumption mode from the base station through RRC signaling and/or an MAC layer CE; or receive the configuration information of the first power consumption mode from the base station through DCI; or receive the configuration information of the first power consumption mode from the base station through an RNTI-scrambled PDCCH.

Figure 9:
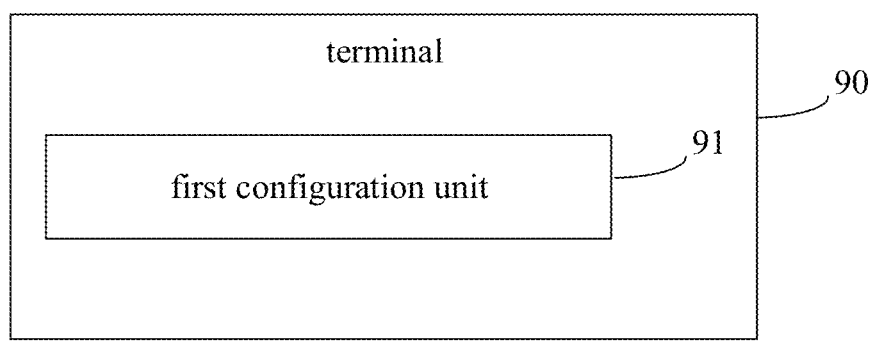
FIG. 9 is another schematic view showing the terminal according to an embodiment of the present disclosure.

As shown in FIG. 9, the present disclosure further provides in some embodiments a terminal 90, which includes a first configuration module 91 used to configure a power consumption mode of the terminal as a first power consumption mode at a first time point. Two or more power consumption modes may be supported by the terminal.

In a possible embodiment of the present disclosure, when the first power consumption mode is a normal power consumption mode or a power-saving mode, the first configuration module 91 is further used to: receive measurement information of the first power consumption mode from a base station, and configure the power consumption mode of the terminal as the first power consumption mode in accordance with the configuration information; or determine the first power consumption mode in accordance with a measurement value of a target signal, and configure the power consumption mode of the terminal as the first power consumption mode; or determine the first power consumption mode in accordance with capability information of the terminal, and configure the power consumption mode of the terminal as the first power consumption mode; or determine the first power consumption mode in accordance with configuration information of a reception antenna of the terminal and configure the power consumption mode of the terminal as the first power consumption mode; or randomly select and configure one of the normal power consumption mode and the first power consumption mode as the power-saving mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, when the first power consumption mode is a sleep mode, the first configuration module 91 is further used to: configure the power consumption mode of the terminal as the first power consumption mode in accordance with configuration information of the first power consumption mode from the base station; or determine the first power consumption mode in accordance with capability information of the terminal, and configure the power consumption mode of the terminal as the first power consumption mode; or determine the first power consumption mode in accordance with configuration information of a reception antenna of the terminal, and configure the power consumption mode of the terminal as the first power consumption mode; or randomly select and configure one of the sleep modes as the first power consumption mode; or configure the first power consumption mode of the terminal in accordance with a configuration history of the power consumption mode of the terminal; or configure the first power consumption mode of the terminal in accordance with a service type of the terminal.

In a possible embodiment of the present disclosure, the terminal may further include a second configuration unit used to, prior to configuring the power consumption mode of the terminal as the first power consumption mode, configure a second power consumption mode as its own power consumption at a second time point, and the second power consumption mode may be different from the first power consumption mode.

In a possible embodiment of the present disclosure, the first time point and the second time point may each be a pre-agreed configuration time, or a static/semi-static configuration time, or a dynamic configuration time. The dynamic configuration may include transmitting, by the base station, the configuration information of the first power consumption mode through DCI, or transmitting, by the base station, the configuration information of the first power consumption mode through an RNTI-scrambled PDCCH.

In a possible embodiment of the present disclosure, the second power consumption mode may be a normal power consumption mode or a power-saving mode, or the second power consumption mode may be a sleep mode.

In a possible embodiment of the present disclosure, when the second power consumption mode is the normal power consumption mode or the power-saving mode and the first power consumption mode is the normal power consumption mode or the power-saving mode, or when the second power consumption mode is the sleep mode and the first power consumption mode is the sleep mode, the second configuration module is further used to configure a timer corresponding to the second power consumption mode according to a configuration of the base station, wherein timer corresponding to the second power consumption mode is used to notify the terminal to, when the timer reaches a predetermined time value, configure the first power consumption mode.

In a possible embodiment of the present disclosure, when the second power consumption mode is the normal power consumption mode or the power-saving mode and the first power consumption mode is the sleep mode, the first configuration module 91 is further used to: configure an end time point for the transmission of downlink data for the terminal, the end time point being used to indicate a time point at which the terminal is switched to the first power consumption mode, and the end time point being represented by at least one of a boundary of a subframe, a boundary of a slot and a boundary of an OFDM symbol; or configure a first sleep time point at which the terminal is switched to the first power consumption mode, the first sleep time point being the end time point for the transmission of the downlink data for the terminal, or a sum of the end time point and a predetermined first time window, or a sum of a transmission time point for the transmission of the downlink data for the terminal and a predetermined second time window, and the first sleep time point being represented by at least one of a boundary of a subframe, a boundary of a slot and a boundary of an OFDM symbol; or configure a second sleep time point at which the terminal is switched to the first power consumption mode, the second sleep time point being a time point at which a timer for the transmission of the downlink data for the terminal has expired.

In a possible embodiment of the present disclosure, the terminal may further include a reception unit used to receive a power-saving signal for waking up the terminal from the base station in accordance with a predetermined reception mode, and the predetermined reception mode may include a periodic reception mode and an aperiodic on-demand reception mode. The predetermined reception mode may be configured by the base station in accordance with the measurement information or capability information reported by the terminal, or determined by the terminal itself.

In a possible embodiment of the present disclosure, the reception unit is further used to: receive the configuration information of the first power consumption mode from the base station through RRC signaling and/or an MAC layer CE; or receive the configuration information of the first power consumption mode from the base station through DCI; or receive the configuration information of the first power consumption mode from the base station through an RNTI-scrambled PDCCH.

It should be appreciated that, units and steps described in the embodiments of the present disclosure may be implemented in the form of electronic hardware, or a combination of a computer software and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, in the embodiments of the present disclosure, the device and method may be implemented in any other ways. For example, the embodiments for the device is merely for illustrative purposes, and the units are provided merely on the basis of their logic functions. During the actual application, they may be provided in another manner, e.g., some units or components may be combined together or integrated into another system. Alternatively, some features may be omitted or not executed. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure.

In addition, the functional units in the various embodiments of the present disclosure may be integrated into one processing unit, or each unit may exist alone physically, or two or more units may be integrated into one unit.

In the case that the functional units are implemented in a software form and sold or used as a separate product, they may be stored in a computer-readable medium. Based on this, the technical solutions of the present disclosure, essentially, or parts of the technical solutions of the present disclosure contributing to the related art, or parts of the technical solution, may appear in the form of software products, which may be stored in a storage medium and include instructions so as to enable computer equipment (e.g., a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above are only specific implementations of the present disclosure, but the protection scope of the present disclosure is not limited thereto. A person skilled in the art may make further modifications and improvements without departing from the spirit of the present disclosure, and these modifications and improvements shall also fall within the scope of the present disclosure. Therefore, the protection scope of the present disclosure should be subject to the protection scope of the claims.

What is claimed is:

1. A power-saving state switching method, comprising:
configuring, by a base station, a first power consumption mode of a terminal at a first time point, and transmitting configuration information of the first power consumption mode to the terminal,
wherein two or more power consumption modes are supported by the terminal,
the two or more power consumption modes comprise a normal power consumption mode and a low power consumption mode, and the low power consumption mode comprises at least one power-saving mode, or at least one sleep mode, or both the at least one power-saving mode and the at least one sleep mode,
wherein power consumption of the terminal in the normal power consumption mode is greater than the power consumption of the terminal in the low power consumption mode, the power consumption of the terminal in the power-saving mode is greater than the power consumption of the terminal in the sleep mode, and the respective power consumptions of the terminal in different power-saving modes or sleep modes are different,
when the first power consumption mode is the normal power consumption mode or the power-saving mode, the configuring the first power consumption mode of the terminal comprises:
configuring, by the base station, the first power consumption mode of the terminal in accordance with configuration information of a reception antenna of the terminal; or
randomly selecting, by the base station, one power consumption mode from the normal power consumption mode and the power-saving modes as the first power consumption mode; or
configuring, by the base station, the first power consumption mode of the terminal in accordance with a configuration history of the power consumption mode of the terminal; or
configuring, by the base station, the first power consumption mode of the terminal in accordance with a service type of the terminal,
wherein the power-saving mode comprises at least one of: a first power-saving mode based on the reception of a Wake-Up Signal (WUS), a second power-saving mode where a bandwidth for downlink control channel detection, or the quantity of times of downlink control channel blind detection, or both the bandwidth for downlink control channel detection and the quantity of times of the downlink control channel blind detection are reduced, a third power-saving mode where the quantity of times of Radio Resource Management (RRM) measurement is reduced, a fourth power-saving mode where the quantity of reception antennae is reduced, and a fifth power-saving mode where a transmission bandwidth, or a reception bandwidth, or the transmission bandwidth and the reception bandwidth are adjusted.

2. The power-saving state switching method according to claim 1, wherein when the first power consumption mode is the sleep mode, the configuring the first power consumption mode of the terminal comprises:
configuring, by the base station, the first power consumption mode of the terminal in accordance with capability information reported by the terminal.

3. The power-saving state switching method according to claim 1, wherein prior to configuring the first power consumption mode of the terminal, the power-saving state switching method further comprises:
configuring, by the base station, a second power consumption mode of the terminal at a second time point, and transmitting, by the base station, configuration information of the second power consumption mode to the terminal, wherein the second power consumption mode is different from the first power consumption mode.

4. The power-saving state switching method according to claim 3, wherein
the first time point and the second time point are each a pre-agreed configuration time; or
the first time point and the second time point are each a static/semi-static configuration time; or
the first time point and the second time point are each a dynamic configuration time.

5. The power-saving state switching method according to claim 3, wherein
the second power consumption mode is a normal power consumption mode or a power-saving mode; or
the second power consumption mode is a sleep mode.

6. The power-saving state switching method according to claim 5, wherein when the second power consumption mode is the normal power consumption mode or the power-saving mode and the first power consumption mode is the normal power consumption mode or the power-saving mode, or when the second power consumption mode is the sleep mode and the first power consumption mode is the sleep mode, the configuring the second power consumption mode of the terminal comprises:
configuring, by the base station, a timer corresponding to the second power saving mode, wherein the timer corresponding to the second power saving mode is used to notify the terminal to, when the timer reaches a predetermined time value, be subjected to the step of configuring the first power consumption mode of the terminal.

7. The power-saving state switching method according to claim 5, wherein when the second power consumption mode is the normal power consumption mode or the power-saving mode and the first power consumption mode is the sleep mode, the configuring the first power consumption mode of the terminal further comprises:
configuring an end time point for transmission of downlink data for the terminal, the end time point being used to indicate a time point at which the terminal is switched to the first power consumption mode, and the end time point being represented by at least one of a boundary of a subframe, a boundary of a slot and a boundary of an Orthogonal Frequency Division Multiplexing (OFDM) symbol; or
configuring a first sleep time point at which the terminal is switched to the first power consumption mode, the first sleep time point being the end time point for the transmission of the downlink data for the terminal, or a sum of the end time point and a predetermined first time window, or the first sleep time point being a sum of a transmission time point for the transmission of the downlink data for the terminal and a predetermined second time window, and the first sleep time point being represented by at least one of the boundary of the subframe, the boundary of the slot and the boundary of the OFDM symbol; or configuring a second sleep time point at which the terminal is switched to the first power consumption mode, the second sleep time point being a time point at which a timer for the transmission of the downlink data of the terminal expires.

8. The power-saving state switching method according to claim 5, further comprising:

transmitting, by the base station, a power-saving signal for waking up the terminal in accordance with a predetermined transmission mode, the predetermined transmission mode comprising a periodic transmission mode and an aperiodic on-demand transmission mode, wherein the predetermined transmission mode is configured by the base station in accordance with the measurement information or capability information reported by the terminal, or the predetermined transmission mode is determined by the terminal itself.

9. The power-saving state switching method according to claim 1, wherein the transmitting, by the base station, the configuration information of the first power consumption mode to the terminal comprises:

transmitting, by the base station, the configuration information of the first power consumption mode through Radio Resource Control (RRC) signaling, or a Medium Access Control (MAC) layer (Control Element (CE), or both the RRC signaling and the MAC layer CE; or transmitting, by the base station, the configuration information of the first power consumption mode through an indication of Downlink Control Information (DCI); or transmitting, by the base station, the configuration information of the first power consumption mode through a Radio Network Temporary Identity (RNTI)-scrambled downlink control channel.

10. The power-saving state switching method according to claim 1, wherein the normal power consumption mode is a mode where the terminal receives first data based on a first power consumption, and the reception of the first data comprises reception of a downlink control channel, reception of a Synchronization Signal (SS), reception of a downlink service channel, reception of a Channel State Information Reference Signal (CSI-RS), reception of a Cell Reference Signal (CRS) or reception of a broadcast signal;

the power-saving mode is a mode where the terminal receives second data based on a second power consumption smaller than the first power consumption, and the reception of the second data comprises reception of a Wake-Up Signal (WUS), the reception of the downlink control channel, the reception of the SS, the reception of the downlink service channel, the reception of the CSI-RS, the reception of the CRS or the reception of the broadcast signal, wherein the sleep mode is a mode where the power consumption of the terminal is smaller than a predetermined power consumption threshold, a mode where the terminal does not transmit and receive data, or a mode where all or parts of components of the terminal are disabled.

11. The power-saving state switching method according to claim 1, wherein the sleep mode comprises at least one of a first sleep mode and a second sleep mode, wherein the first sleep mode is a sleep mode where the terminal is in downlink synchronization with a serving base station, and the second sleep mode is a sleep mode where the terminal does not need to be in downlink synchronization with the serving base station; or the first sleep mode is a power consumption mode where the terminal is switched from the first sleep mode to the power-saving mode or a switching time of the normal power consumption mode is smaller than or equal to a first time threshold, and the second sleep mode is a power consumption mode where the terminal is switched from the second sleep mode to the power-saving mode or the switching time of the normal power consumption mode is greater than or equal to a second time threshold, wherein the second time threshold is greater than or equal to the first time threshold; or the first sleep mode is a power consumption mode where components of the terminal at a proportion smaller than or equal to a first proportion are disabled, and the second sleep mode is a power consumption mode where the components of the terminal at a proportion greater than or equal to a second proportion are disabled, wherein the second proportion is greater than or equal to the first proportion; or the first sleep mode is a power consumption mode where fine synchronization or time-frequency tracking needs to be performed after the terminal has been switched from the first sleep mode to the normal power consumption mode or the power-saving mode, and then DCI or service information is received, and the second sleep mode is a power consumption mode where cell identification needs to be performed after the terminal has been switched from the second sleep mode to the normal power consumption mode or the power-saving mode, to receive the DCI or the service information, wherein the cell identification comprises at least one of the following behaviors: rough synchronization and fine synchronization, reading a broadcast message, cell selection, and reading a system message.

12. The power-saving state switching method according to claim 1, wherein when the first power consumption mode is the sleep mode, the configuring the first power consumption mode of the terminal comprises:

randomly selecting, by the base station, one sleep mode, and configuring, by the base station, the one sleep mode as the first power consumption mode.

13. The power-saving state switching method according to claim 1, wherein when the first power consumption mode is the sleep mode, the configuring the first power consumption mode of the terminal comprises:

configuring, by the base station, the first power consumption mode of the terminal in accordance with a configuration history of the power consumption mode of the terminal.

14. The power-saving state switching method according to claim 1, wherein when the first power consumption mode is the sleep mode, the configuring the first power consumption mode of the terminal comprises:

configuring, by the base station, the first power consumption mode of the terminal in accordance with a service type of the terminal.

15. A power-saving state switching method, comprising:

configuring, by a terminal, a power consumption mode of the terminal as a first power consumption mode at a first time point, wherein two or more power consumption modes are supported by the terminal, the two or more power consumption modes comprise a normal power consumption mode and a low power consumption mode, and the low power consumption mode comprises at least one power-saving mode, or at least one sleep mode, or both the at least one power-saving mode and the at least one sleep mode, wherein power consumption of the terminal in the normal power consumption mode is greater than the power consumption of the terminal in the low power consumption mode, the power consumption of the terminal in the power-saving mode is greater than the power consumption of the terminal in the sleep mode, and the respective power consumptions of the terminal in different power-saving modes or sleep modes are different, when the first power consumption mode is the normal power consumption mode or the power-saving mode, the configuring, by the terminal, the power consumption mode of the terminal as the first power consumption mode at the first time point comprises:

determining, by the terminal, the first power consumption mode in accordance with capability information of the terminal, and configuring, by the terminal, the power consumption mode of the terminal as the first power consumption mode; or determining, by the terminal, the first power consumption mode in accordance with configuration information of a reception antenna of the terminal, and configuring, by the terminal, the power consumption mode of the terminal as the first power consumption mode; or uniformly and randomly selecting, by the terminal, one of the normal power consumption mode and the power-saving mode to configure the first power consumption mode; or configuring, by the terminal, the first power consumption mode of the terminal in accordance with a configuration history of the power consumption mode of the terminal; or configuring, by the terminal, the first power consumption mode of the terminal in accordance with a service type of the terminal, wherein the power-saving mode comprises at least one of: a first power-saving mode based on the reception of a Wake-Up Signal (WUS), a second power-saving mode where a bandwidth for downlink control channel detection, or the quantity of times of downlink control channel blind detection, or both the bandwidth for downlink control channel detection and the quantity of times of the downlink control channel blind detection are reduced, a third power-saving mode where the quantity of times of Radio Resource Management (RRM) measurement is reduced, a fourth power-saving mode where the quantity of reception antennae is reduced, and a fifth power-saving mode where a transmission bandwidth, or a reception bandwidth, or the transmission bandwidth and the reception bandwidth are adjusted.

16. The power-saving state switching method according to claim 15, wherein when the first power consumption mode is the sleep mode, the configuring, by the terminal, the power consumption mode of the terminal as the first power consumption mode at the first time point comprises:

configuring, by the terminal, the power consumption mode of the terminal as the first power consumption mode in accordance with configuration information of the first power consumption mode transmitted from the base station; or determining, by the terminal, the first power consumption mode in accordance with capability information of the terminal, and configuring, by the terminal, the power consumption mode of the terminal as the first power consumption mode; or determining, by the terminal, the first power consumption mode in accordance with configuration information of a reception antenna of the terminal, and configuring, by the terminal, the power consumption mode of the terminal as the first power consumption mode; or uniformly and randomly selecting, by the terminal, one of the sleep modes to configure the first power consumption mode; or configuring, by the terminal, the first power consumption mode of the terminal in accordance with a configuration history of the power consumption mode of the terminal; or configuring, by the terminal, the first power consumption mode of the terminal in accordance with a service type of the terminal.

17. The power-saving state switching method according to claim 15, wherein prior to configuring the power consumption mode of the terminal as the first power consumption mode, the power-saving state switching method further comprises:

configuring, by the terminal, the power consumption mode of the terminal as a second power consumption mode at a second time point, wherein the second power consumption mode is different from the first power consumption mode.

18. A terminal, comprising a transceiver, a memory, a processor, and a computer program stored in the memory that, when executed by the processor, causes the terminal to: implement the power-saving state switching method according to claim 15.

19. A base station, comprising a transceiver, a memory, a processor, and a computer program stored in the memory that, when executed by the processor, causes the base station to:

configure a first power consumption mode of a terminal at a first time point, wherein two or more power consumption modes are supported by the terminal; and transmit configuration information of the first power consumption mode to the terminal, wherein the two or more power consumption modes comprise a normal power consumption mode and a low power consumption mode, and the low power consumption mode comprises at least one power-saving mode, or at least one sleep mode, or both the at least one power-saving mode and the at least one sleep mode, wherein power consumption of the terminal in the normal power consumption mode is greater than the power consumption of the terminal in the low power consumption mode, the power consumption of the terminal in the power-saving mode is greater than the power consumption of the terminal in the sleep mode, and the respective power consumptions of the terminal in different power-saving modes or sleep modes are different, when the first power consumption mode is the normal power consumption mode or the power-saving mode, the configuring the first power consumption mode of the terminal comprises:

configuring the first power consumption mode of the terminal in accordance with configuration information of a reception antenna of the terminal; or randomly selecting one power consumption mode from the normal power consumption mode and the power-saving modes as the first power consumption mode; or configuring the first power consumption mode of the terminal in accordance with a configuration history of the power consumption mode of the terminal; or configuring the first power consumption mode of the terminal in accordance with a service type of the terminal, wherein the power-saving mode comprises at least one of: a first power-saving mode based on the reception of a Wake-Up Signal (WUS), a second power-saving mode where a bandwidth for downlink control channel detection, or the quantity of times of downlink control channel blind detection, or both the bandwidth for downlink control channel detection and the quantity of times of the downlink control channel blind detection are reduced, a third power-saving mode where the quantity of times of Radio Resource Management (RRM) measurement is reduced, a fourth power-saving mode where the quantity of reception antennae is reduced, and a fifth power-saving mode where a transmission bandwidth, or a reception bandwidth, or the transmission bandwidth and the reception bandwidth are adjusted.

* * * * *